INVENTOR.
Waldemar T. Rentschler
BY
Munn, Liddy, Daniels & March
ATTORNEYS

United States Patent Office 2,943,550
Patented July 5, 1960

2,943,550
PHOTOGRAPHIC INTRA-LENS SHUTTER

Waldemar T. Rentschler, Calmbach (Enz), Germany, assignor to Alfred Gauthier G.m.b.H., Calmbach (Enz), Germany, a corporation of Germany Filed July 20, 1956, Ser. No. 599,160

Claims priority, application Germany July 25, 1955

2 Claims. (Cl. 95—63)

This invention relates to photographic intra-lens shutters of the type having exposure-time setting members adapted to be shifted to different predetermined positions.

Photographic intra-lens shutters having adjustable exposure time setting members utilizing a detent action have a number of advantages, one of which is that an exact setting to a marked exposure time may be accomplished by the sensation of touch, without dependence on vision. However, even with this organization there is the possibility that the exposure-time setting member may be inadvertently placed in an intermediate position which does not correspond with any of the marked settings or notch-controlled settings. This is especially likely if the setting members for the exposure time and the diaphragm are coupled to each other for simultaneous adjustment. In cases where the controlling cam for the exposure-time setting member does not have a constant characteristic, as for example where it constitutes a step cam, the setting of the member to a position between two marked or notched positions may result in misexposure of the film.

The above drawback and disadvantage of shutters embodying these prior exposure time setting members is obviated by the present invention, and an object of the invention is to provide an improved photographic intra-lens shutter of the above type, wherein it is impossible to release the shutter or make an exposure if the time setting member is not properly located in one of the designated positions.

In accomplishing this, there is provided by the invention a releasable locking device and a cooperable notched member associated with the time setting member, said locking device preventing actuation of the shutter release mechanism whenever the exposure time setting member is not properly placed in one of its marked or notched positions.

In the embodiments of the invention illustrated herein the releasable locking means is constituted in a simple and effective manner as a lever which may comprise an abutment for blocking a movable part of the shutter release mechanism. Such lever may cooperate with the grooved detent portion of the exposure time setting member.

Where space is limited in the shutter housing, there may be additionally provided a transmission member by which the control function of the exposure-time setting member may be readily brought to the shutter release mechanism when the latter is located in a more remote position.

Other features and advantages will hereinafter appear.

In the drawings accompanying this specification, similar characters of reference indicate corresponding parts wherever possible in the several views, in which.

Figure 1:
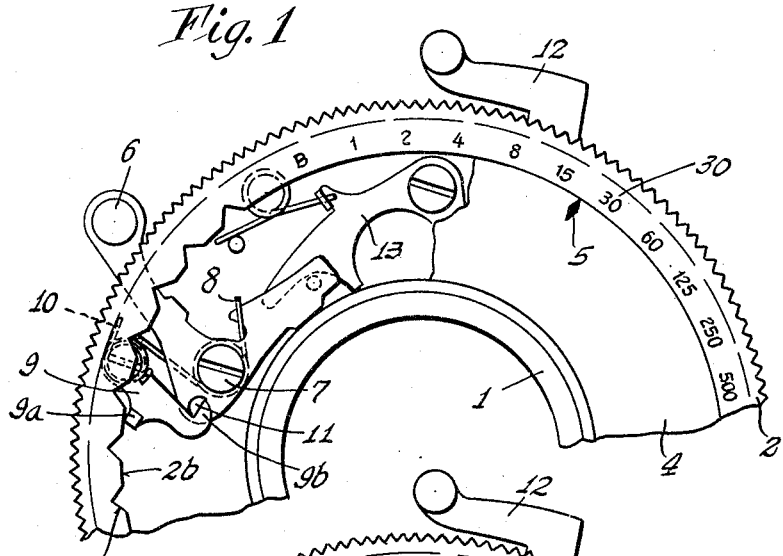
Figure 1 is a front elevational view of a shutter with the front plate thereof partially broken away, revealing the novel locking device of the invention, the shutter release mechanism being locked against actuation.
Figure 2:
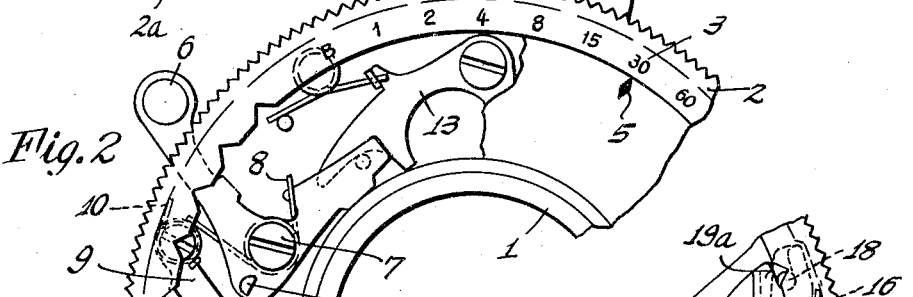
Fig. 2 is a view like Fig. 1 but with the shutter release mechanism unlocked or in actuatable condition.

Referring to Figs. 1 and 2, there is shown an intra-lens shutter having a housing 1 provided with a movably-mounted exposure-time setting ring 2, said ring having on its front surface a scale 3 comprising indicia designating exposure times. The shutter has a front plate 4 on which there is disposed an index mark 5 cooperable with the scale 3 to indicate a plurality of different, predetermined, spaced positions for the setting member 2.

The shutter mechanism includes a shutter release member in the form of a lever 6 pivoted about an axis 7, said lever being shiftable counterclockwise against the action of a return spring 8 in order to effect release of the shutter mechanism.

For the purpose of providing a detent action in connection with the exposure-time setting ring 2, thereby to facilitate the proper positioning of said ring by means of the sense of touch, the ring is provided with a plurality of grooves 2a cooperating with an arm 9a of a lever 9 pivotally mounted in the housing 1. The lever 9 is continually urged clockwise by a coil spring 10 whereby the arm 9a is maintained in engagement with the grooved portion of the ring 2, thereby to function as a detent means therefor.

In accordance with the invention I provide a novel and improved releasable locking means, in conjunction with the grooved portion of the setting ring 2 and the lever 9, thereby to effect an automatic latching of the shutter release lever 6 whenever the setting ring is not in one of its designated positions, i.e., whenever the arm 9a is not engaged in one of the grooves 2a.

In the embodiment of the invention illustrated in Figs. 1 and 2 the said locking device includes the lever 9 and a pin 11 cooperable with the lever and carried by the shutter release lever 6. Preferably, as shown, the lever 9 has a locking hook 9b, and the pin 11 has a cross section in the shape of a semicircle, providing a flat for engagement with the hook 9b. Thus, the hook 9b constitutes a blocking or abutment means by which there is prevented clockwise turning of the release lever 6 when the aforesaid engagement exists.

Operation of the improved locking device of this invention is as follows: In Figs. 1 and 2, the shutter cocking lever 12 is shown in cocked position, with the release lever 6 in the "at rest" position, ready for release of the cocking lever when an exposure is to be made. In Fig. 1 the exposure-time setting ring 2 is shown as incorrectly positioned, the ring presenting the numerals 15 and 30 on opposite sides of the index mark 5, such numerals indicating 1/15 of a second and 1/30 of a second. For such position of the ring 2 the arm 9a of the lever 9 will not be engaged with one of the grooves 2a but instead will be touching a raised or land portion 2b between adjacent grooves. Thus the lever 9 will be held in a counterclockwise position by virtue of which the locking hook 9b will engage and block the pin 11 of the release lever 6, preventing counterclockwise or releasing movement of said lever. Therefore the release lever 6 cannot actuate the transmission lever 13 by which the cocking lever 12 is maintained cocked.

Referring to Fig. 2 the exposure-time setting ring 2 is correctly positioned, indicating an exposure time of 1/30 of a second, and the arm 9a of the lever 9 is engaged in one of the grooves 2a of the ring 2. For such condition the locking hook 9b will be disengaged from and out of the path of movement of the pin 11, thus freeing the release lever 6 for counterclockwise actuation whenever the exposure is desired. I have thus provided by this invention a positive and foolproof automatic latching means of extremely simple and economical construction by which it is made impossible for the operator to release the shutter and expose the film if the exposure-time setting ring 2 is not properly positioned for any one of the indicated exposure times.

For the purpose of obtaining exact exposure times, and also to allow for the use of known-slow speed assemblies which serve to obtain various exposure times, the controlling cams which adjust for the shutter speeds are not continuously variable but instead are stepped or of a stepped shape. With such an organization, any setting of the time setting member to a position between such steps will result in exposure times which are not exactly defined and for which the shutter manufacturers make no guarantee of accuracy. Thus, by the present invention I have provided, for such stepped-cam construction, a highly desirable mechanism which makes foolproof the operation of the shutter as regards the time settings thereof, eliminating the possibility of taking pictures with improperly defined exposure times leading to misexposures.

The danger of incorrectly setting the time-setting ring 2 is especially great in photographic shutters wherein the time-setting member and the diaphragm setting member are coupled and jointly adjustable. For such devices it may often happen that the diaphragm setting member will be against an end stop while simultaneously the exposure-time setting member will be in a position between two of its indications. However, by the present invention there is eliminated this possibility of misexposures due to improper positioning of the time-setting ring, the operator's attention being called to the fact that such ring is not set in a proper, notched position.

Often, the mounting requirements of certain photographic shutters may make it impractical or impossible to arrange the grooves 2a adjacent the shutter release lever 6 indicated in Figs. 1 and 2. By this invention there is provided a novel transmission means, by which the grooves of the exposure-time setting ring may be disposed remote from the release lever while still functioning to releasably lock the latter in a positive and advantageous way. This transmission means is illustrated in the embodiment of the invention shown in Fig. 3. In this figure the grooves 2a of the exposure-time setting ring 2 cooperate with a two-armed lever 14 which is pivotally mounted in the housing about an axis 15 and is spring-biased counterclockwise by a coil spring 16. The lever 14 has a dependent pin 17 which is held in engagement with the inner notched periphery of the ring 2 by the spring 16. The lever 14 also has a second pin 18 extending through a longitudinal slot 19a of a two-armed lever 19 pivotally carried by an axis 20. The lever 19 has an arm 19b engaging a pin 21 of a spring-charged locking lever 22 corresponding to the lever 9. The lever 22 is normally urged clockwise by a coil spring 23, as will be understood.

It will be readily appreciated that whenever the pin 17 is disengaged from one of the grooves 2a; i.e., whenever the exposure time setting ring 2 is in any position different from the settings indicated for it, the lever 14 will position the lever 19 so as to maintain the locking lever 22 in its blocking position, preventing counterclockwise or release movement of the shutter release lever 6.

Upon the setting ring 2 being properly positioned, the pin 17 will occupy one of the grooves 2a, shifting the lever 19 counterclockwise and allowing the locking lever 22 to have clockwise movement, thereby releasing the shutter release lever 6 for actuation.

Figure 3:
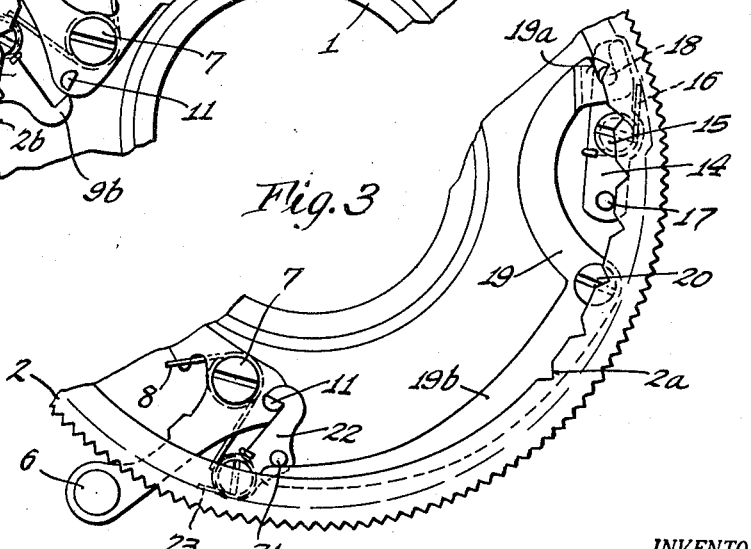
Fig. 3 is a front view of a shutter somewhat similar to that of Fig. 1 but illustrating a modification of the invention.

The advantages of the structure illustrated in the modification of the invention shown in Fig. 3 are similar to those of the structures of Figs. 1 and 2, with the added advantage that the long transmission lever 19 enables the notched portion of the setting ring 2 to be located remote from the shutter release lever 6. Thus the improved latching means of this invention may be incorporated in shutters having various and different space requirements.

It will be understood that structures other than those shown herein may also be provided without departing from the spirit of the invention, the objective being to prevent actuation of the shutter whenever the exposure-time setting member is not properly positioned.

Variations and modifications may be made within the scope of the claims, and portions of the improvements may be used without others.

I claim:

1. A photographic shutter comprising a housing, a shutter operating mechanism, said mechanism including a shutter speed setting ring rotatable with respect to said housing, said ring being adapted to have indicia affixed thereto, said housing being adapted to have means cooperable with said indicia for indicating the shutter speed setting, said ring having means attached thereto extending exteriorly of said housing for manual manipulation thereof, said shutter operating mechanism including a shutter release member, a detent means cooperable with said ring for releasably securing said ring in pre-selected set positions corresponding to pre-selected speeds of said shutter, said detent means comprising a series of spaced indentations formed on said ring, and a pawl cooperable therewith, a detent lever pivotally mounted on said housing, said pawl being connected to said lever, means normally urging said lever and pawl into bearing relationship with said ring with said pawl being receivable in said indentations, said ring and indentations thereof being movable past said pawl and said ring comprising raised portions with respect to the base of said indentations operable to move said lever in alternate pivotal movements as said pawl moves in and out of said indentations during movement of said ring with respect to the pivotal axis of said detent lever, said shutter release member being provided with a pin affixed thereto, said detent lever having a locking hook, said shutter release member having a normal rest position, said locking hook extending substantially tangentially with respect to said pin and said pin being received intermediate said hook and said detent lever pivot axis in locking engagement with said hook of the latter lever when said shutter release member is in said rest position and said pawl is on one of said raised portions of said ring, said hook being movable out of locking engagement with said pin when said pawl is received in one of said indentations and said release member is in said rest position.

2. A shutter comprising a housing, a movable speed setting member adapted to bear indicia for indicating the speed setting of said shutter, detent means cooperable with said movable member for releasably securing said member in preselected speed settings, said detent means including a detent lever pivotally connected to said housing, and cooperable with mating detent elements positioned in spaced relationship on said movable member, a shutter release member having a normal rest position, said detent means lever having a lock element, said shutter release member having a second lock element, said lock elements being movable into cooperable relationship for locking said release member in said rest position, means normally urging said lever and said release member and their lock elements out of locking relationship, said detent means being operable to force said detent lever lock element into locking connection with said release member lock element during movement of said speed setting member from one of said preselected positions to any other of said pre-selected positions when said shutter release member is in said rest position.

References Cited in the file of this patent

UNITED STATES PATENTS

| | | |
|---|---|---|
| 1,893,327 | Howell | Jan. 3, 1933 |
| 2,515,330 | Bolsey | July 18, 1950 |

FOREIGN PATENTS

| | | |
|---|---|---|
| 666,844 | Germany | Oct. 29, 1938 |